US010417565B1

(12) United States Patent
Millstein et al.

(10) Patent No.: US 10,417,565 B1
(45) Date of Patent: Sep. 17, 2019

(54) SYSTEM, METHOD, AND COMPUTER PROGRAM FOR MODELING AND PREDICTING ENERGY CONSUMPTION IN A BUILDING

(71) Applicant: Carbon Lighthouse, Inc., San Francisco, CA (US)

(72) Inventors: Brenden Samuel Millstein, El Cerrito, CA (US); Raphael Chayim Rosen, Berkeley, CA (US); Francisco Isenberg, San Francisco, CA (US); Emma Bassein, San Francisco, CA (US); Matthew Ganser, San Francisco, CA (US); Amy Watson Figueiredo, El Cerrito, CA (US); Charlotte Stone Helvestine, San Francisco, CA (US); Louis Francois Langlois, San Francisco, CA (US); Angela Karen Kwok, San Francisco, CA (US); William Joseph Hayes, San Francisco, CA (US); Niels Godfredsen, San Francisco, CA (US); Dan Wei, Union City, CA (US); William Dale Vaughn, San Francisco, CA (US)

(73) Assignee: Carbon Lighthouse, Inc., San Francisco, CA (US)

( * ) Notice: Subject to any disclaimer, the term of this patent is extended or adjusted under 35 U.S.C. 154(b) by 0 days.

(21) Appl. No.: 16/024,767

(22) Filed: Jun. 30, 2018

(51) Int. Cl.
G06N 5/02 (2006.01)
G06F 17/50 (2006.01)

(52) U.S. Cl.
CPC .............. G06N 5/02 (2013.01); G06F 17/50 (2013.01)

(58) Field of Classification Search
CPC .................. G06N 5/02; G06F 17/50
(Continued)

(56) References Cited

U.S. PATENT DOCUMENTS

2017/0017735 A1* 1/2017 Srinivasan ........... G01R 22/061
2017/0192398 A1* 7/2017 Nasle .................... G06Q 10/04

FOREIGN PATENT DOCUMENTS

WO WO-2013090026 A2 * 6/2013 ............. G02D 4/002

OTHER PUBLICATIONS

Coakley et al. "A review of methods to match building energy simulation models to measured data" Renewable and Sustainable Energy Reviews 37, pp. 123-141. (Year: 2014).*

(Continued)

Primary Examiner — Suzanne Lo
(74) Attorney, Agent, or Firm — Lessani Law Group, PC

(57) ABSTRACT

The present disclosure describes a system, method, and computer program for modeling and predicting energy use by non-plug-load mechanical/electrical systems in a building, such as lighting systems or HVAC systems. The present disclosure also discloses methods for using such models and predictions to identify energy saving measures for a building. An energy-consumption model for a building is built from energy-consumption models for components within the mechanical-electrical systems. Inputs to the energy-consumption model (i.e., values of variables in the energy-consumption model) are measurable, and behavior models are created for each of the inputs primarily from sensor and/or other measurement-device data. Using the behavior models, weather data, and the energy-consumption model for the building, a predicted non-plug-load energy use for the building is calculated based on the current configurations of the mechanical/electrical systems. Potential energy saving measures are identified by modeling the energy-con- (Continued)

sumption of alternate physical configurations of the mechanical/electrical systems.

27 Claims, 10 Drawing Sheets

(58) Field of Classification Search
USPC .......................................................... 703/6
See application file for complete search history.

(56) References Cited

OTHER PUBLICATIONS

Magnier et al. "Multiobjective optimization of building design using TRNSYS simulations, genetic algorithm, and Artificial Neural Network" Building and Environment 45, pp. 739-746. (Year: 2010).*
Crawley et al. "Contrasitng the capabilities of building energy performance simulation programs" Building and Environment 43, pp. 661-673. (Year: 2008).*
Solar Energy Laboratory, "TRNSYS 17 A Transient System Simulation Program" vol. 4, Mathematical Reference, 486 pages. (Year: 2009).*

* cited by examiner

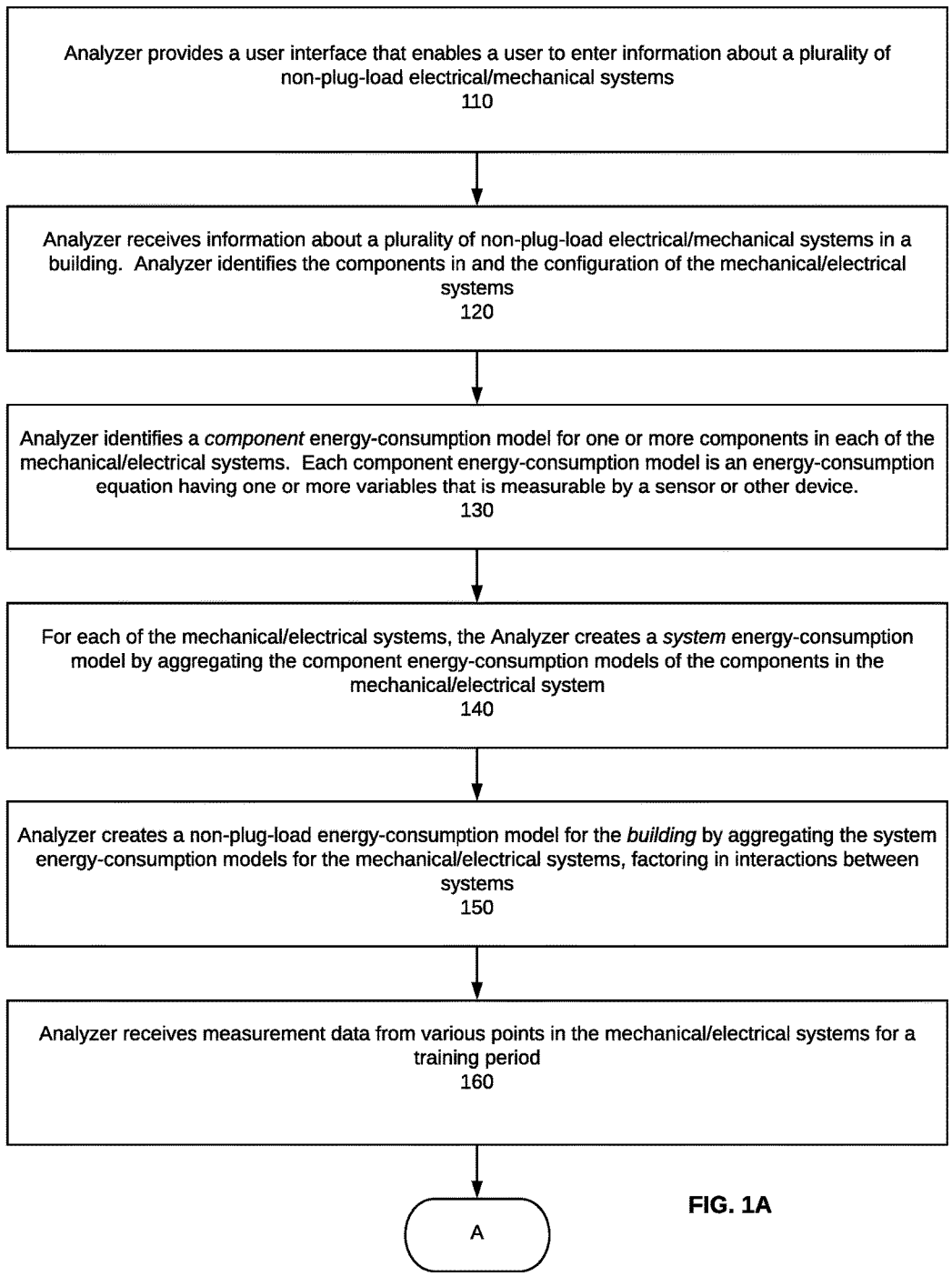

Creating an Energy-Savings Proposal

For each of the possible energy-saving measures, the Analyzer determines whether the measure satisfies feasibility and return-on-investment constraints
310

Analyzer outputs an energy-savings proposal that lists the energy-saving measures that satisfy feasibility and return-on-investment constraints
320

CHILLED WATER SYSTEM
Behavior of Variables

C=f(fluid type)

$GPM_1$=f($Ch_1$ Valve Position)

Ch Valve 1 Position=f(Time of Day, Day of Week, Outside Air Temperature, Relative Humidity, CH Valve 2 position, $AHU_1$ Energy, $AHU_2$ Energy...)

$T_1$=f(Time of Day, Day of Week, Outside Air...)

$T_2$=f(Time of Day, Day of Week, Outside Air...)

.

.

.

GPM3=f(AHU Valve 1, Time of Day, Day of Week, Outside Air Temperature, Relative Humidity...)

.

.

.

$GPM_1 + GPM_2 = GPM_3 + GPM_4 + GPM_5 + GPM_6$

FIG. 8

SYSTEM, METHOD, AND COMPUTER PROGRAM FOR MODELING AND PREDICTING ENERGY CONSUMPTION IN A BUILDING

BACKGROUND OF THE INVENTION

1. Field of the Invention

This invention relates generally to modeling energy consumption of buildings, and, more specifically, to modeling and predicting energy consumption in a building.

2. Description of the Background Art

Commercial buildings can consume large amounts of energy to provide the necessary lighting, heating, cooling, ventilation, etc. required by building occupants. Reducing energy use can result in significant cost savings and environmental benefits.

To identify energy-saving measures, it is necessary to understand how a building uses energy and how changes to the way systems in the building are configured would affect energy use. Achieving this understanding is aided by accurate models for energy consumption based on current and alternate configurations of mechanical/electrical systems in the building.

The current industry standard tools for modeling energy consumption in a building (e.g., software packages like eQuest, Energy Plus, and Energy Pro) primarily work in the same basic way:

1. Create an estimate of the whole building energy use based on hundreds to thousands of user inputs, primarily related to the construction of the building (e.g., thickness of walls, number of windows, etc.). The user inputs are used to estimate the values of U and A in the following physics equation: Energy=U*A*deltaT.
2. If the user also inputs information about what equipment is present, energy consumption estimates for the equipment are derived by dividing the whole building energy use among the equipment.

This is a "top down" approach in that first an estimate is created for the whole building and then the estimate is divided up among the equipment in the building.

There are several major problems with this method. First, most of the inputs asked for are not measurable. Rather, they are "rules of thumb" or "estimates" at best, and guesses or wild guesses more often. This stems from the physics equation that governs these models. While Energy=U*A*deltaT is an accurate physics equation, the U-value is based on physical characteristics of the building that, once built, are not feasible to model or estimate accurately. These include things such as: wall thickness, wall material, insulation material, insulation thickness, distance between studs, distance between rafters, exact dimensions of rafters, estimates of the air-gap between insulation and rafters, exact dimensions and orientations of walls, exact dimension and counts and orientations of all windows, whether window frames are "thermally broken" or not, etc., etc., etc. In short, the inputs required to accurately measure U or A are not possible to accurately ascertain after construction.

Second, there are too many inputs. Some models require thousands of inputs, which makes using such models very time consuming for facility managers.

Third, the way in which the models are calibrated effectively strip the model of predictive capabilities. After the models are made, they are used to generate predictions for energy use for the past twelve months based on real weather data. The engineer using the model then compares those predictions to what actually happened, and here is where the main problem lies: that engineer then plays with the inputs until the model "matches" reality. The problem is that, because there are hundreds or thousands of inputs regarding building characteristics, and almost none of them are feasible to measure accurately, there are thousands or tens of thousands of ways to make the model "match" reality by altering the input values (i.e., the building characteristics). But only one of these thousands of ways is representative of reality, and thus only one set of inputs will accurately predict how the building will behave if configurations are changed. In other words, only one set of building characteristics are the real characteristics, but, with the current methods, there is no way for an engineer to ascertain which set is the real set during the calibration process.

Therefore, when the models are used to make energy consumption "predictions" for various configurations and optimizations of systems in a building, the models fail to accurately predict energy savings because the "baseline" model is not based on actual reality. See F. Burlig, C. Knittel, D. Rapson, M. Reguant, and C. Wolfram, "Machine Learning from Schools about Energy Efficiency," *E2e Working Paper* 032, 2017, for a 2000+ building study that revealed that predictions from energy-efficiency projects failed to match reality.

Therefore, there is demand for a method for modeling building energy consumption based on parameters that can be quickly and cost-effectively measured and that do not rely on inaccurate estimates of building characteristics.

SUMMARY OF THE DISCLOSURE

The present disclosure describes a system, method, and computer program for modeling and predicting energy use by mechanical/electrical systems in a building, such as lighting systems, HVAC systems, and other non-plug load systems. The present disclosure also sets forth methods for using such models and predictions to identify energy-saving measures for a building.

A computer system for performing the methods disclosed herein ("the Analyzer") provides a user interface in which a user inputs information about the mechanical/electrical systems in the building. The information enables the Analyzer to identify the components in and the configurations of non-plug-load mechanical/electrical systems in the building. The Analyzer then uses a "ground up" approach to model the non-plug-load energy consumption of the building. First, the Analyzer assigns an energy-consumption equation to components within each mechanical/electrical system. Then, the Analyzer builds an energy-consumption model for each mechanical/electrical system by aggregating the energy-consumption models of the components within each mechanical/electrical system. Finally, the Analyzer creates an energy-consumption model for the building by combining the energy-consumption models for the individual mechanical/electrical systems, factoring in interactions between systems.

The energy-consumption equations in the component-level, system-level, and building-level models have variables. The values for such variables that are used to make an energy-consumption prediction are primarily derived from inputs that are measured by a sensor or other measurement device, such as outside temperature, indoor temperature, fan speed, relative humidity, etc. Accordingly, the Analyzer receives sensor data and/or other measurement data corresponding to the mechanical/electrical systems, including data received on a continuous basis during a training/calibration period for the energy-modeling process from sensors deployed in the mechanical/electrical systems. For avoidance of doubt, "data corresponding to the mechanical/electrical systems" may be or may include data corresponding to individual components within the mechanical/electrical systems. Using the sensor and/or other measurement data from a training period, as well as weather and time data, the Analyzer creates behavior models for the variables in the equations in order to predict the value of the variables at different times and under different weather circumstances. For components with configurable settings, the Analyzer also is able to ascertain the current setting by modeling the different configuration options and identifying the behavior model that best matches the measurement data.

Using the behavior models, weather data for a time period, and the energy-consumption model for the building, the Analyzer predicts the energy use for the building during the time period based on the current configurations of the mechanical/electrical systems. In one embodiment, the weather data is for a typical meteorological year (i.e., a TMY weather data set), resulting in an energy prediction for a typical meteorological year.

In one embodiment, a method for modeling and predicting non-plug-load energy consumption of a building comprises:
  providing a user interface that enables a user to enter information about a plurality of non-plug-load mechanical/electrical systems in the building ("the mechanical/electrical systems");
  receiving information about the mechanical/electrical systems via the user interface, wherein the information includes a physical configuration for each of the mechanical/electrical systems and one or more components within each of the mechanical/electrical systems;
  creating a component energy-consumption model for one or more components in each of the mechanical/electrical systems, each component energy-consumption model comprising an applicable energy-consumption equation having one or more variables;
  for each of the mechanical/electrical systems, creating a system energy-consumption model by aggregating the component energy-consumption models of components in the mechanical/electrical system;
  creating a building-level model for the non-plug-load energy-consumption of the building by aggregating the system energy-consumption models for the mechanical/electrical systems, factoring in interactions between the mechanical/electrical systems, resulting in the building-level model having an applicable aggregate of the energy-consumption equations from the component and system energy-consumption models, each of the energy-consumption equations in the building-level model having one or more variables;
  receiving measurement data corresponding to the mechanical/electrical systems during a training period, wherein the measurement data includes data received on a continuous basis during the training period from sensors placed in the mechanical/electrical system;
  receiving weather data during the training period ("the training-period weather data");
  creating behavior models for variables in the energy-consumption equations in the building-level model from the measurement data and the training-period weather data;
  receiving weather data for a prediction period ("the prediction-period weather data");
  using the behavior models and prediction-period weather data to calculate values for variables in the energy-consumption equations in the building-level model for the prediction period;
  creating a baseline non-plug-load energy-consumption prediction for the building by applying the variable values to the building-level model, wherein applying the variable values to the building-level model comprises:
    using the variable values for the prediction period to calculate a predicted energy consumption of the components within the mechanical/electrical systems during the prediction period; and
    aggregating the predicted energy consumption of the components, factoring in interactions between the mechanical/electrical systems, to obtain the baseline non-plug-load energy prediction for the building; and
  outputting the baseline non-plug-load energy-consumption prediction.

In certain embodiments, the Analyzer is able to identify potential energy-saving measures by modeling the energy consumption of alternate physical configurations of the mechanical/electrical systems. The alternate configurations are based on known configuration options. The models are created in the same "ground up" approach as described above. The models for the alternate configurations are used to predict the energy consumption of the building if the alternate configurations were implemented. If an alternate configuration results in a lower energy-consumption prediction, the Analyzer identifies that configuration as a potential energy-savings measure.

In certain embodiments, the Analyzer determines if identified energy-saving measures satisfy cost and return-on-investment constraints. Any measure satisfying such constraints may be outputted in an energy-savings proposal.

In certain embodiments, after any energy-saving measures are implemented, the Analyzer may verify the continued performance of those measures by modeling and receiving sensor data from mechanical/electrical systems in a building after energy-saving measures have been implemented.

The methods described herein enable accurate predictions of energy consumption and energy savings. Unlike existing systems, models for the behavior of variables in the energy-consumption models are primarily derived from data that is measured by sensors or other measurement devices during a training/calibration period (which can be after construction of the building) for the energy-consumption-modeling process. They do not significantly depend on any estimates or guesses related to construction characteristics of the building that are impossible to verify after construction of the building. Furthermore, recommendations for how to implement energy-savings measures and corresponding energy-savings predictions are reliable because they are based on the one configuration that actually matches the building. This is different from existing modeling solutions in which many of the inputs to the model are not measurable after construction of the building, and, consequently, render it nearly impossible to create a model that reflects the physical realities of the building.

BRIEF DESCRIPTION OF THE DRAWINGS

FIGS. 1A-B are flowcharts that illustrate a method, according to one embodiment, for modeling and predicting non-plug-load energy consumption of a building.

FIG. 8 illustrates example and simplified representations of variable behavior models.

DETAILED DESCRIPTION OF THE PREFERRED EMBODIMENTS

The present disclosure describes a system, method, and computer program for modeling and predicting the non-plug-load energy consumption of a building. The methods described herein are performed by a computer system, which is referred to as "the Analyzer" herein.

A plug-load system draws power from an interior outlet, for example a printer or laptop. A non-plug-load system is any mechanical and/or electrical system that uses energy but does not draw any power from an outlet, for example overhead lights or a heating, ventilation, and air conditioning (HVAC) system.

As set forth in more detail below, the modeling methods described herein are based on a "ground up" approach in which the energy-consumption model for the non-plug load components of a building is based on the energy consumption of components within non-plug-load systems and their physical configurations and settings. The inputs to the energy-consumption models are based primarily on data from sensors and/or other measurements or measurement devices.

The present disclosure also describes methods for using the models and predictions to identify energy-saving measures, create an energy-savings proposal, and verify the performance of energy-saving measures. Viable changes to the physical configurations or the settings of mechanical/electrical systems are modeled and used to identify those changes that lead to energy savings.

1. Modeling and Predicting Non-Plug-Load Energy Consumption of a Building

Figure 1B:
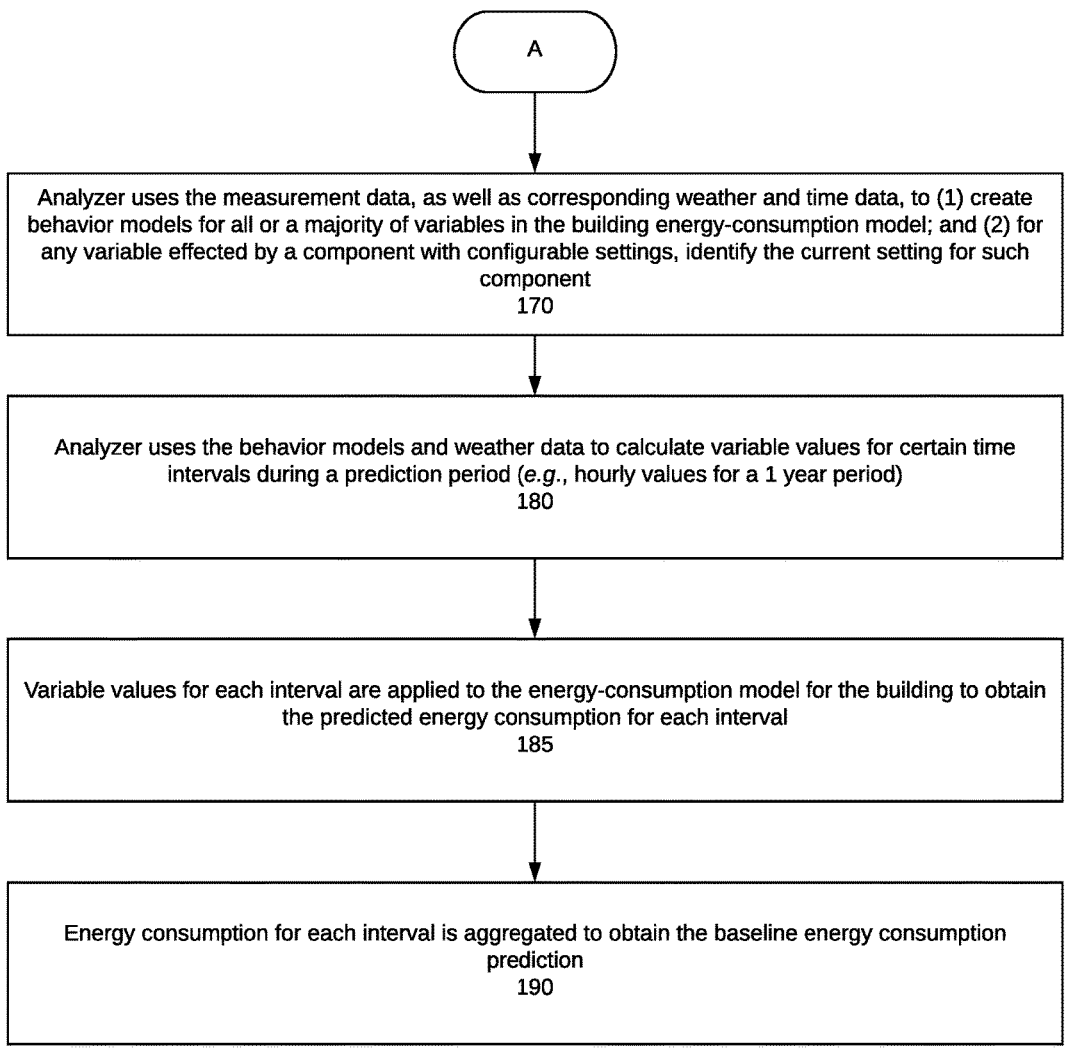

FIG. 1 illustrates a method for modeling and predicting non-plug-load energy consumption of a building. As context for the method, a non-plug-load mechanical/electrical system may have one or more potential configurations. For example, if a condenser water pumping system has two pumps, those pumps could be in series or in parallel. Accordingly, the Analyzer provides a user interface that prompts a user, such as a facility manager, energy engineer, or system administrator, for information that enables the Analyzer to identify components within non-plug-load mechanical/electrical systems and to determine their physical configuration (step 110). For example, for a chilled water system, the system would prompt a user for the number of pumps and whether they are in series or parallel. In one embodiment, the Analyzer has access to a library of non-plug-load mechanical/electrical systems, including the known configuration options, and the Analyzer uses the information provided through the user interface to identify which of the systems in the library are in the building at issue, including which configuration option.

1.1. Identifying Component Energy Consumption Models

In response to receiving, via the user interface, information that enables the Analyzer to identify the components in and the configuration of a plurality of non-plug-load mechanical/electrical systems in a building ("the mechanical/electrical systems"), the Analyzer identifies a component energy-consumption model (a "component-level model") for one or more components in each of the mechanical/electrical systems (steps 120, 130). Each component-level model is an applicable energy-consumption equation (e.g., a thermodynamic equation) having one or more variables. The variables in the component energy-consumption equations and the factors that affect such variables are primarily measurable by a sensor or other device. In one embodiment, the Analyzer performs step 130 by accessing a library that maps electrical/mechanical components to energy-consumption equations.

Figure 6:
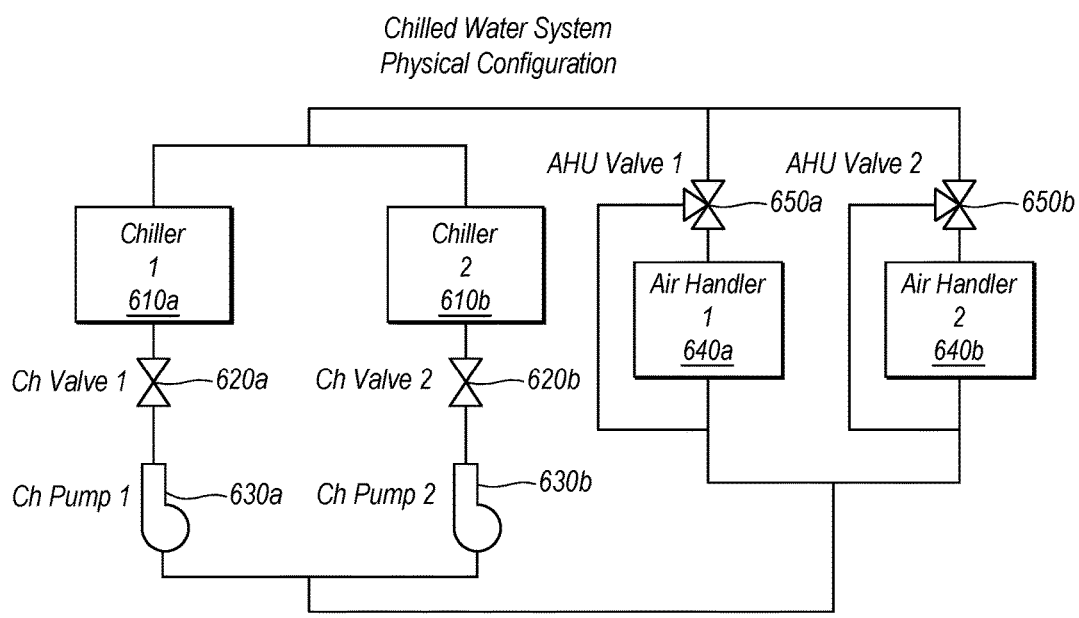
FIG. 6 is a diagram of an example mechanical/electrical system configuration.
Figure 7:
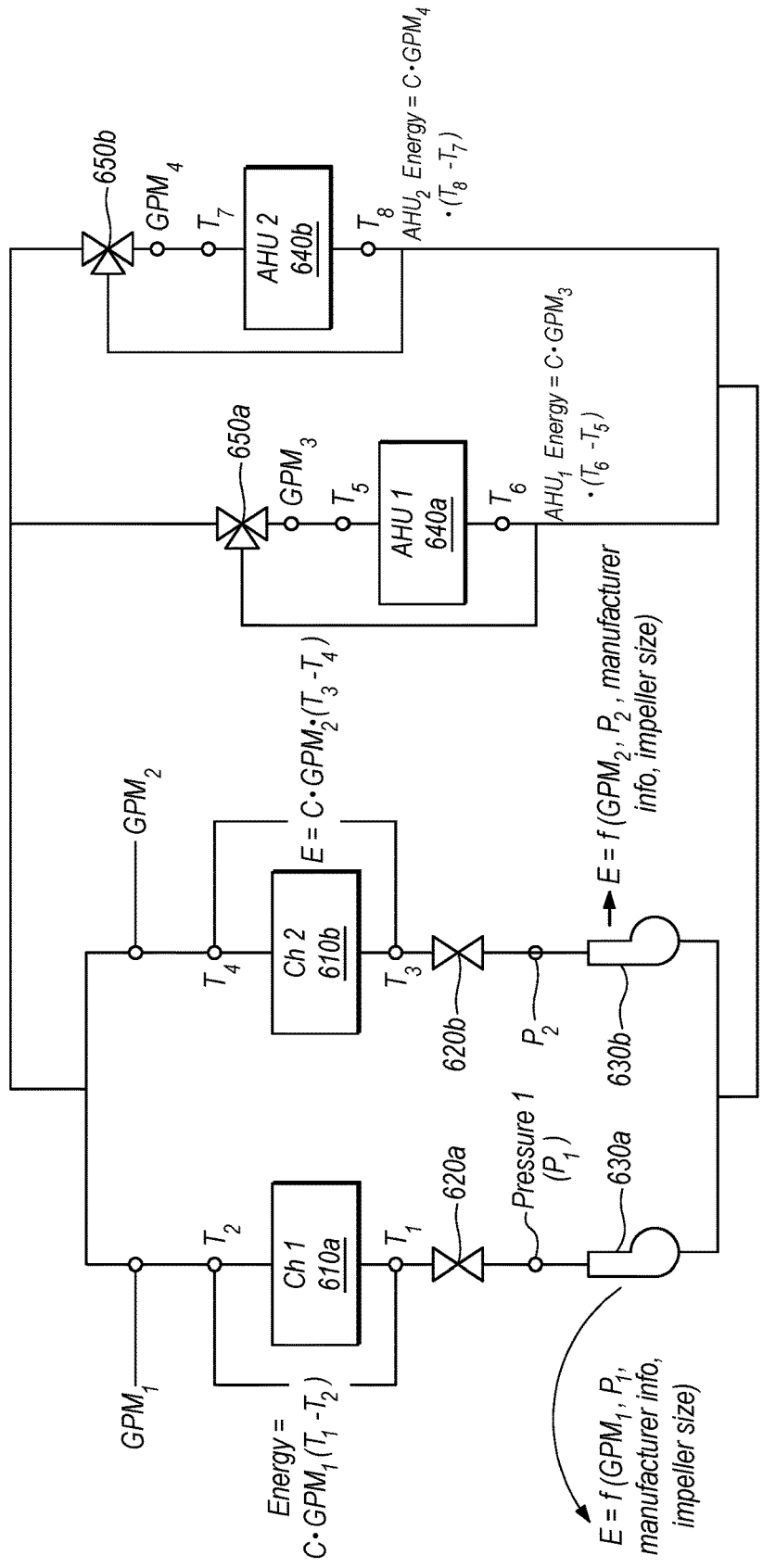
FIG. 7 is a diagram of an example mechanical/electrical system with associated energy-consumption equations for components within the system.

FIG. 6 illustrates an example of a chilled water system configuration. The illustrated chilled water system has two chillers 610a-b in parallel, two chiller valves 620a-b, two pumps 630a-b in parallel, two air handlers 640a-b in parallel, and two air handler valves 650a-b. FIG. 7 illustrates the same chilled water system, but with a thermodynamic equation associated with each of the chillers 610a-b, pumps 630a-b, and air handler units 640a-b. The thermodynamic equation associated with a component is the energy-consumption model for that component.

1.2 Creating System Energy-Consumption Models

For each of the mechanical/electrical systems, the Analyzer creates a system energy-consumption model (a "system-level model") by aggregating the component-level models for components in the mechanical/electrical system and accounting for their interactive effects (step 140). With respect to the example chilled water system illustrated in FIGS. 6 and 7, the energy-consumption model for the system (i.e., the system-level model) is the aggregate of illustrated energy equations and their interactive effects. In the illustrated example of FIGS. 6 and 7, there are only a few components and energy equations. However, in many mechanical/electrical systems, there may be hundreds of components, resulting in system-level models that have hundreds of energy equations.

1.3 Creating a Building Energy-Consumption Model

The Analyzer creates a model for the non-plug-load energy consumption of the building by aggregating the system-level models for the mechanical/electrical systems, factoring in interactions between systems (step 150). One or more components within a system may also be in other systems. For example, an air handler could be a component within a chilled water system, a VAV system, and a boiler system. In such case, the Analyzer counts the energy use of that component only once.

1.4 Creating Behavior Models and Identifying Component Settings

The above-described modeling process results in a building-level model for non-plug-load energy use that is based on the energy consumption of individual components within the mechanical/electrical systems. Each of the energy-consumption equations in the model includes one or more variables. In order to predict how much energy will be consumed by the non-plug-load systems in the building during a period of time, the Analyzer needs to understand what factors influence the behavior of the variables and how they do so. Accordingly, the Analyzer builds behavior models for the variables based on input data related to the mechanical/electrical systems and input data related to weather conditions. Such input data is received by the Analyzer during a training period (step 160). All or substantially all (e.g., 95%) the inputs to the Analyzer that are used to create behavior models can be classified as "measurement data." Measurement data is data resulting from a measurement by a sensor, an automated system, or a conventional measuring device (e.g., a ruler, thermometer, a barometer, etc.).

Some input measurement data directly corresponds to the values of the variables during a training period. For example, in a building including the chilled water system of FIGS. 6 and 7, the Analyzer would receive sensor readings for $T_1$, $T_2$, $T_3$, and $T_4$ during a training period. These readings correspond directly to variables in the energy-consumption equations because $T_1$, $T_2$, $T_3$, and $T_4$ are variables in the energy-consumption equations for Chillers 610a and 610b.

Some measurement data corresponds to factors that may influence the behavior of the variables, such as weather data (e.g., outside air temperature at hourly intervals, relative humidity at hourly intervals), and data corresponding to properties of or the operation of the mechanical/electrical systems (e.g., fan speed, valve positions, etc.)

The majority of the measurement data comes from sensors deployed at various points in the mechanical/electrical systems. The sensor data is received on a on a continuous basis (e.g., every 3 seconds or every 5 minutes, depending on what is being measured) during a training/calibration period (e.g., 30-60 days) for the energy-consumption-modeling process. In one embodiment, in response to a user entering mechanical/electrical configuration data in the user interface, the Analyzer outputs the locations where sensors should be placed based on a predetermined mapping of components and/or systems to sensor locations.

Measurement data may also come from building management systems (BMS) and utility meters (e.g., data from the utility company, or a submeter). This data may also be received on a continuous basis during a training period. Measurement data received from sensors, building management systems, and utility meters is associated with time data, such as the time of day and day of week of the applicable reading. For avoidance of doubt, data received on a "continuous basis" includes data received at regular intervals and, in some cases, data received when there is a change in state (e.g., "on" or "off").

The Analyzer may also receive some measurement data (whether corresponding to the variables directly or to factors that may influence the variables) in the form of one-time static inputs from a user. For example, some measurements, such as the horsepower of a motor, may be obtained from an equipment or component manufacturer. In such case, it is not necessary to use a sensor to obtain such measurements, and they are instead inputted by a user into the Analyzer. Such static inputs are still considered "measurement data" in that they are not guesses or estimates, but are based on measurements, even if the measurement was performed by a component or system manufacturer.

In certain embodiments, a few static inputs to the Analyzer may be based on well-bounded estimates. For example, building power factor is a multiplier for calculating power and can have values between 0-1. It is typically a value that can be measured with a measuring device. However, for equipment where it is not possible to measure this value, the value may be assumed to be 0.85. Even in these embodiments, substantially all (e.g., >95%) of the inputs to the Analyzer are still measurement data.

In one embodiment, the system uses a predetermined mapping of mechanical/electrical system types and configurations to determine the type of continuous and static inputs required to build behavior models.

The Analyzer uses the above-described inputs to do the following: (1) create behavior models for all or substantially all (e.g., >95%) of variables in the building energy-consumption model; and (2) for any variable affected by a component with configurable settings, identify the current setting for such component (step 170). In other words, component settings and models for the behavior of the variables are derived from the inputted measurement data.

A behavior model is a function that specifies the factors that influence the behavior of the variable, including precisely how such factors affect the value of a variable. A behavior model for a variable enables the Analyzer to obtain a value for the variable given values for the inputs of which the variable is a function. For example, if a variable is a function of outside temperature and time of day, the behavior model will enable the Analyzer to ascertain the value of the variable given a certain outside temperature and time of day. FIG. 8 illustrates examples of the factors that influence the variables in the energy consumption model for the chilled water system of FIGS. 6 and 7. For ease of illustration, only the factors are illustrated, but the actual behavior model would specify the mathematical relationships between the factors.

The Analyzer may create the behavior models by analyzing the measurement data using standard machine learning tools, such as "Scikit-learn" linear regression tools (e.g., ElasticNet Cross Validation with Regularization") or data optimization tools, such as Root Mean Square Error (RMSE) optimization tools from NumPy Developers. Through such analysis, the Analyzer learns, for each variable in the building model, which inputs to the Analyzer influence that variable and how. Some variables may also be affected by the value of another variable or the energy consumed by another component within a mechanical/electrical system. Consequently, such data may also be factored in by the machine learning/data optimization tools. Generically, using the aforementioned tools to build behavior models for a variable given a set of input values is known in the art. If a variable is known to be a function of a single input with a constant value, then it may not be necessary for the Analyzer to create a behavior model for that variable.

Some variables may be dependent on configurable settings of components within the mechanical/electrical system. For example, the output temperature of a component could be configured to have either a static set point or a reset. For such variables, each setting option is modeled for the variable and the Analyzer selects the model that best corresponds to the actual measurement data. In one embodiment, the Analyzer creates or retrieves a "setting behavior model" for each of the potential configurable settings. Each setting behavior model reflects the expected behavior of the variable if the corresponding setting were in effect. The Analyzer then compares the actual behavior model for the variable based on measurement data (from sensors or other automated measurement systems) from the training period to each of the setting behavior models to identify the setting behavior model that best matches the actual behavior model (i.e. the behavior model based on measurement data from the training period). The setting associated with the best-matching setting behavior model is determined to be the current setting of the applicable component. In this way, the Analyzer determines how components with configurable settings are currently set to operate.

1.5 Baseline Energy-Consumption Prediction

The Analyzer uses weather data for a prediction period and the behavior models to calculate variable values (i.e., input values) for a prediction period for the energy-consumption equations in the building model (step 180). The values are calculated for certain time intervals during a prediction period. For example, given the average hourly temperatures on a particular day of the year at a specified location, the behavior models can be used to ascertain the variable values for each hour on a typical instance of that day. If the prediction period is a year, this is done for each hour of the year. Weather data is used because some of the variables in the behavior models will be a factor of outside temperature, humidity, or other weather factors (e.g., solar irradiance). As the energy use of one component can affect the energy use of another component, the output of one energy-consumption equation can affect the output of another energy-consumption equation in the building model.

The variable values for each interval are applied to the energy-consumption model for the building to obtain the predicted energy consumption for each interval (step 185). For each interval, this amounts to calculating the energy consumption of components in the mechanical/electrical systems during the interval, and then aggregating the energy consumed by the components in the interval (factoring in interactions between mechanical/electrical systems) to obtain the non-plug-load energy consumption of the building during the interval. The aggregate energy consumption for all the intervals in the prediction period is the baseline energy-consumption prediction for the prediction period (step 190). This is a prediction of the energy that the non-plug-load mechanical/electrical systems will consume during the prediction period based on their current configurations. In one embodiment, the weather data is for a typical meteorological year (i.e., a TMY dataset or equivalent) at the relevant location, resulting in a baseline energy-consumption prediction for a typical meteorological year at that location.

The Analyzer displays the baseline energy consumption prediction in a user interface or outputs the prediction to a system that uses the prediction (step 195).

2. Modeling and Predicting Energy Consumption of Alternate Configurations

Figure 2:
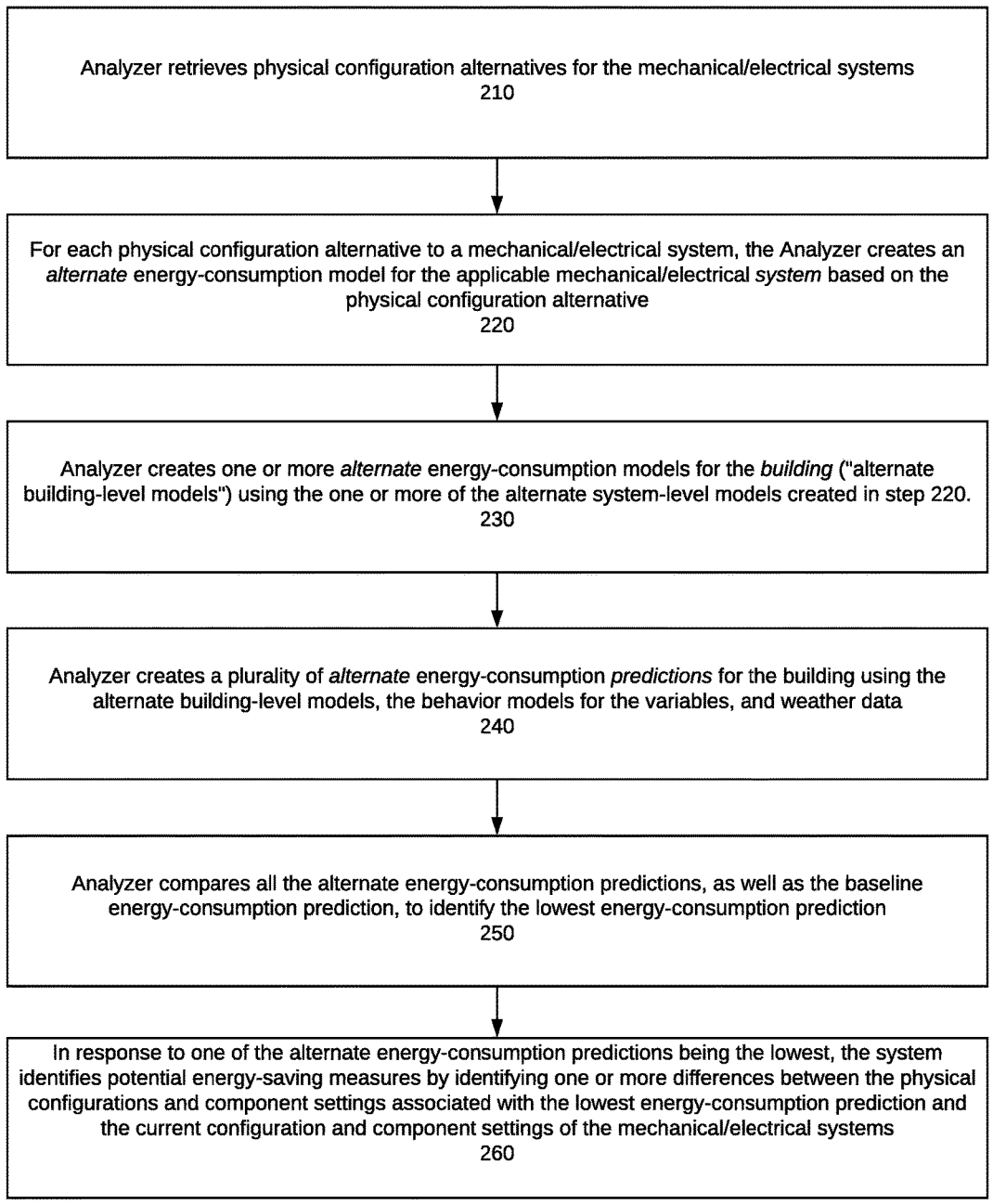
FIG. 2 is a flowchart that illustrates a method, according to one embodiment, for identifying energy-savings measures by modeling how alternate configurations and/or settings of the mechanical/electrical systems consume energy.

The above-described energy-consumption modeling methods also can be used to model alternate configurations and settings for the mechanical/electrical systems. FIG. 2 illustrates a method for identifying energy-saving measures by modeling how alternate configurations and/or settings of the mechanical/electrical systems consume energy. The Analyzer first retrieves physical configuration alternatives for the mechanical/electrical systems (steps 210). In one embodiment, the Analyzer accesses a library of configuration options for various mechanical/electrical systems.

2.1 Creating Alternate Energy-Consumption Models

For each physical configuration alternative for a mechanical/electrical system, the Analyzer creates a system energy-consumption model for the alternative configuration (step 220). This is done by first creating component energy-consumption models for components in each alternative configuration and then aggregating the component energy consumption models to create the alternate system-level model (i.e., using the same process described with respect to 130-140 in FIG. 1.)

The Analyzer then creates one or more alternate energy-consumption models (non-plug-load) for the building based on one or more alternative configurations of the mechanical/electrical systems (step 230). Like step 150 in FIG. 1, this is done by aggregating system-level models, factoring in any interactions between systems. In one embodiment, the Analyzer creates an alternate building-level model of energy consumption for each possible combination of existing and alternate system-level models.

2.2. Creating Alternate Energy-Consumption Predictions

The Analyzer creates a plurality of alternate energy-consumption predictions for the building using the alternate energy-consumption models for the building, the behavior models for the variables, and the weather data (step 240). If a variable in one of the models is dependent on a configurable setting of a component, multiple behavior models are created for the variable, one for each viable setting option. A prediction is then generated for each unique building energy-consumption model/variable behavior model combination. In one embodiment, the weather data is for a typical meteorological year at the relevant location, resulting in energy consumption predictions for a typical meteorological year.

2.3 Identifying Energy Saving Measures

The Analyzer compares all the alternate energy-consumption predictions, as well as the baseline energy-consumption prediction, to identify the lowest energy-consumption prediction (step 250). In response to one of the alternate energy-consumption predictions being the lowest energy consumption prediction, the Analyzer identifies potential energy-savings measures by identifying one or more differences between the physical configurations and component settings associated with the lowest energy-consumption prediction and the current configurations and component settings of the mechanical/electrical system(s) (step 260).

3. Creating Energy Savings Proposal

Figure 3:
FIG. 3 is a flowchart that illustrates a method, according to one embodiment, for creating an energy-savings proposal based on the identified energy-savings measures.

FIG. 3 illustrates a method for creating an energy savings proposal based on the identified energy-saving measures. For each of the potential energy-savings measures, the Analyzer determines whether the measure satisfies feasibility and return-on-investment constraints (step 310). In one embodiment, the Analyzer includes a rules engine that executes rules related to feasibility and return-on-investments requirements. For example, these rules may specify that only measures below a certain cost amount are viable, or they may specify that, over a period of time, there must be a minimum predicted return on the cost of investment to implement a measure. The Analyzer outputs an energy-savings proposal that lists the possible energy-savings measures that satisfy feasibility and return-on-investment constraints (step 320).

The above-described methods result in accurate predictions of energy consumption and energy savings. Unlike existing energy modeling software, models for the behavior of variables in the energy-consumption equations are derived primarily from data that is measured by sensors or other measurement devices. The behavior models, and the corresponding energy-consumption prediction, do not depend substantially on estimates or guesses related to construction characteristics of the building. Moreover, recommendations for how to implement energy-savings measures and corresponding energy-savings predictions are reliable because they are based on the one configuration that actually matches the building. As stated above, this is different from existing modeling solutions in which many of the inputs to the model are not measurable, and, consequently, render it nearly impossible to create a model that reflects the physical realities of the building and thus is predictive of changes, even if the model produces energy predictions that match past utility consumption.

4. Performance Verification

Figure 4A:
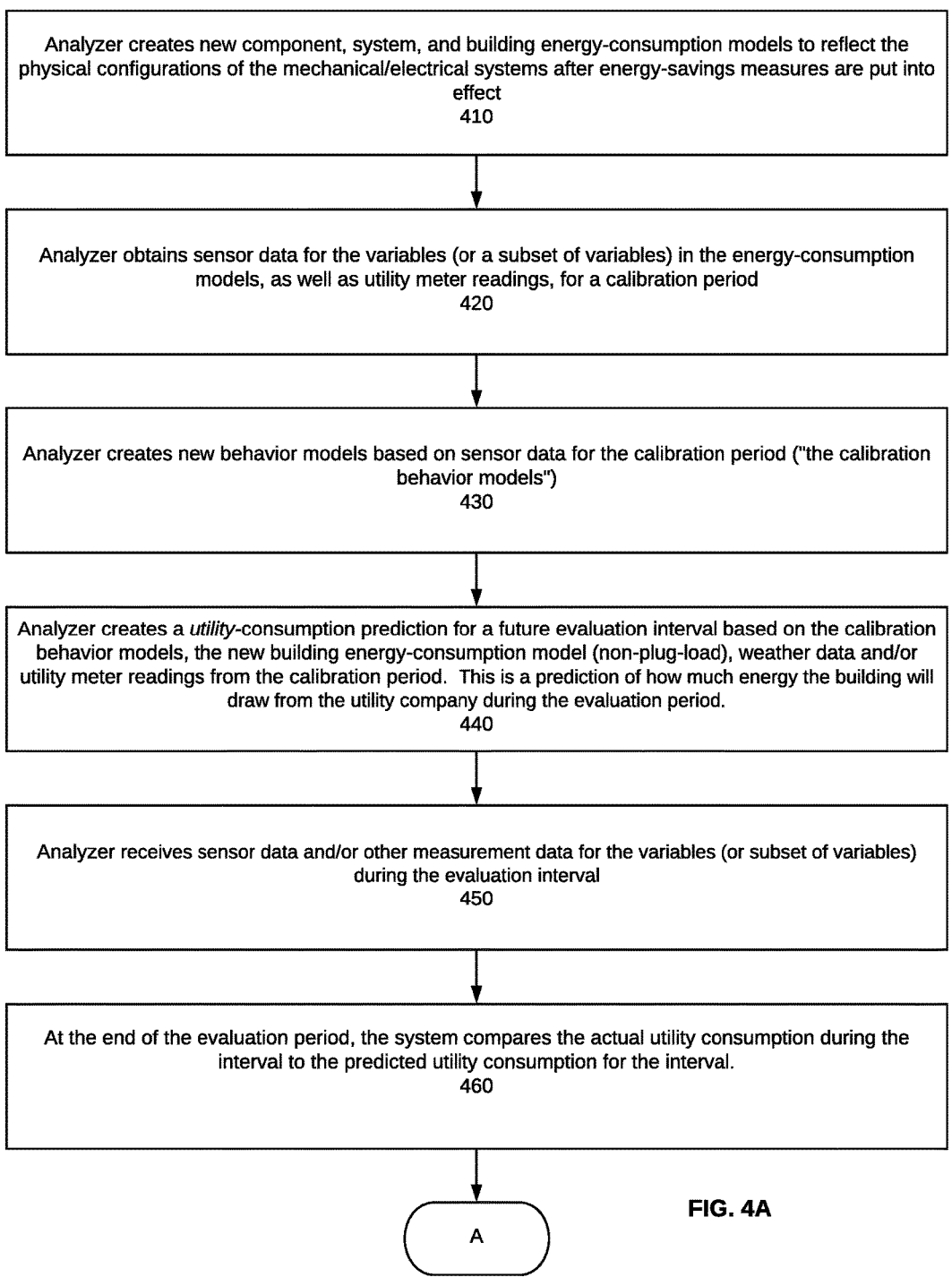
FIGS. 4A-B are flowcharts that illustrate a method, according to one embodiment, for verifying the continued performance of energy-saving measures.
Figure 4B:
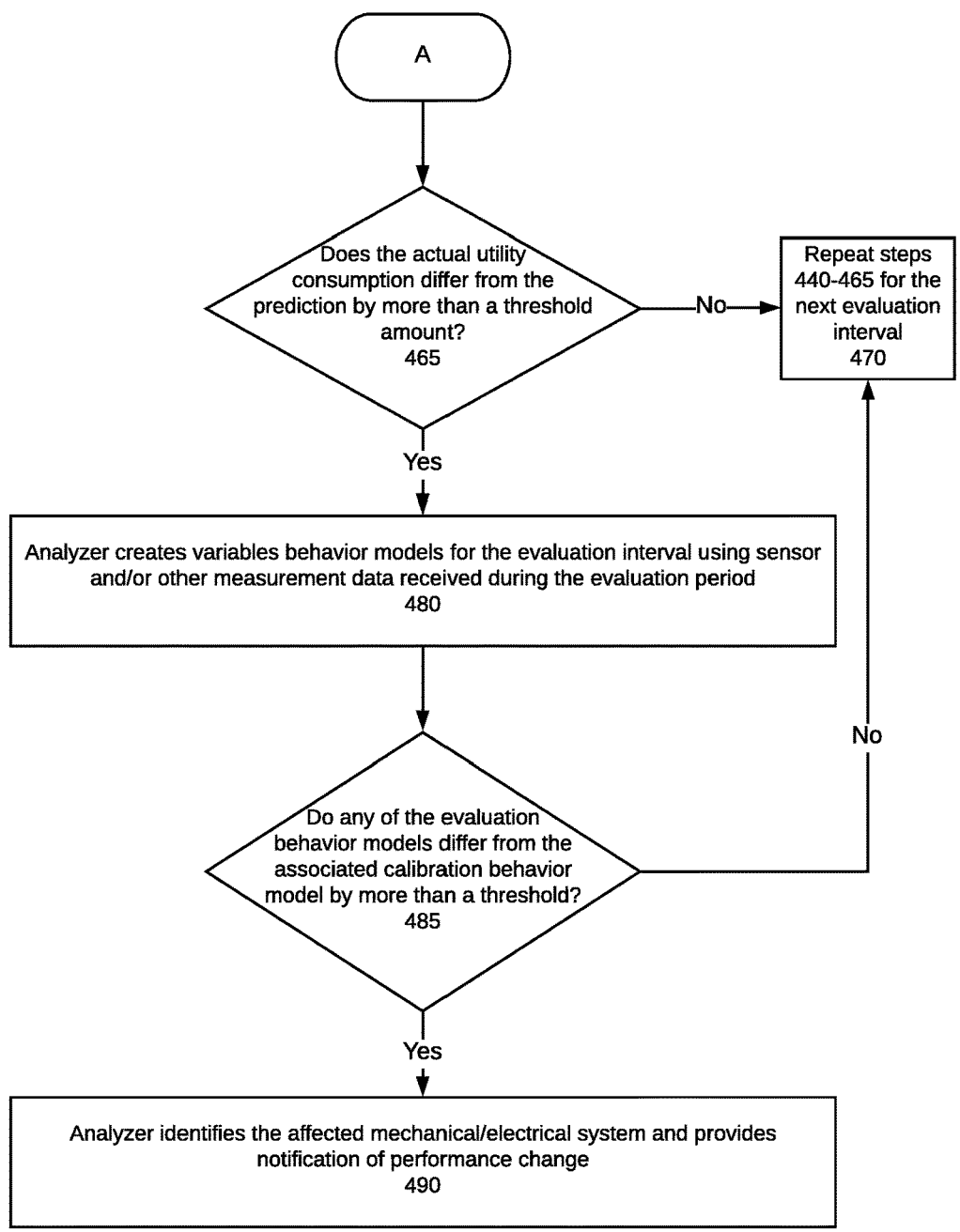

In certain embodiments, after energy-saving measures are implemented, the Analyzer monitors the energy consumption of the building to determine that energy-savings measures continue to perform as predicted. FIG. 4 illustrates a method for verifying the continued performance of energy-saving measures.

The Analyzer creates new component-level, system-level, and building-level energy-consumption models to reflect the physical configurations of the mechanical/electrical systems after energy-saving measures are put into effect (step 410). The Analyzer also obtains sensor data for the variables in the energy-consumption models, as well utility meter readings, for a period of time after the energy-saving measures are implemented ("the calibration period") (step 420). New behavior models are generated based on sensor data for the calibration period ("the calibration behavior models") (step 430). In certain embodiments, the system may model only a portion of the non-plug load systems for performance verification purposes, and in such embodiments, the system may obtain sensor data for only the applicable variables in step 420.

The Analyzer then creates a building utility-consumption prediction for a future evaluation interval (e.g., next 30 days) based on the calibration behavior models, the new building energy-consumption model (non-plug-load energy use), weather data, and/or utility meter readings from the calibration period (step 440). This is a prediction of how much energy the building will draw from the utility company during the evaluation period. The utility consumption prediction incorporates both non-plug-load and plug-load systems.

In one embodiment, the Analyzer uses the new building energy-consumption model (non-plug-load) and the calibration behavior models to calculate the non-plug-load energy consumption during the calibration period. The difference between the calculated non-plug-load consumption and the utility meter readings provide an indication of the energy consumed in the building by plug-load devices and other systems not encompassed by the energy-consumption models. Since the plug-load consumption is likely to remain fixed in a future near-term interval, the Analyzer is able to predict the energy consumption during a near-term evaluation period by using the same plug-load consumption as during the calibration period and by calculating the predicted non-plug-load consumption for the evaluation period using the calibration behavior models, new energy-consumption models, and the expected weather for the evaluation period.

The Analyzer continues to receive sensor and/or other measurement data during the evaluation interval (step 450). Once the evaluation interval has passed, the Analyzer compares the actual utility consumption by the building during the evaluation interval to the predicted utility consumption for the evaluation interval (step 460). If the actual consumption does not differ from the predicted utility consumption by more than a threshold, the Analyzer repeats the process for the next evaluation period (steps 465, 470). In some embodiments, the Analyzer also updates the calibration behavior models with sensor data from the completed interval.

In response to the actual consumption differing from the predicted utility consumption by more than a threshold (e.g., greater than or equal to 5%), the Analyzer creates variable behavior models for the evaluation interval using sensor and/or other measurement data received during the calibration interval (steps 465, 480). The Analyzer then compares the evaluation behavior models to the calibration behavior models to determine if there has been a change in the operation of the non-plug load mechanical/electrical systems (step 485). If a threshold-exceeding change is detected (e.g., an energy consumption change equal to or greater than 5%), the affected system is identified (i.e., the mechanical/electrical system associated with the changed behavior model) and an administrator is notified (e.g., in a user interface, via email, SMS, etc.) (step 490).

In an alternate embodiment, the Analyzer does not perform steps 440-470 and just compares calibration and evaluation behavior models for every evaluation interval. However, it is more computationally efficient to do this comparison only when the utility meter readings exceed what is expected for an interval.

5. Example System Architecture

Figure 5:
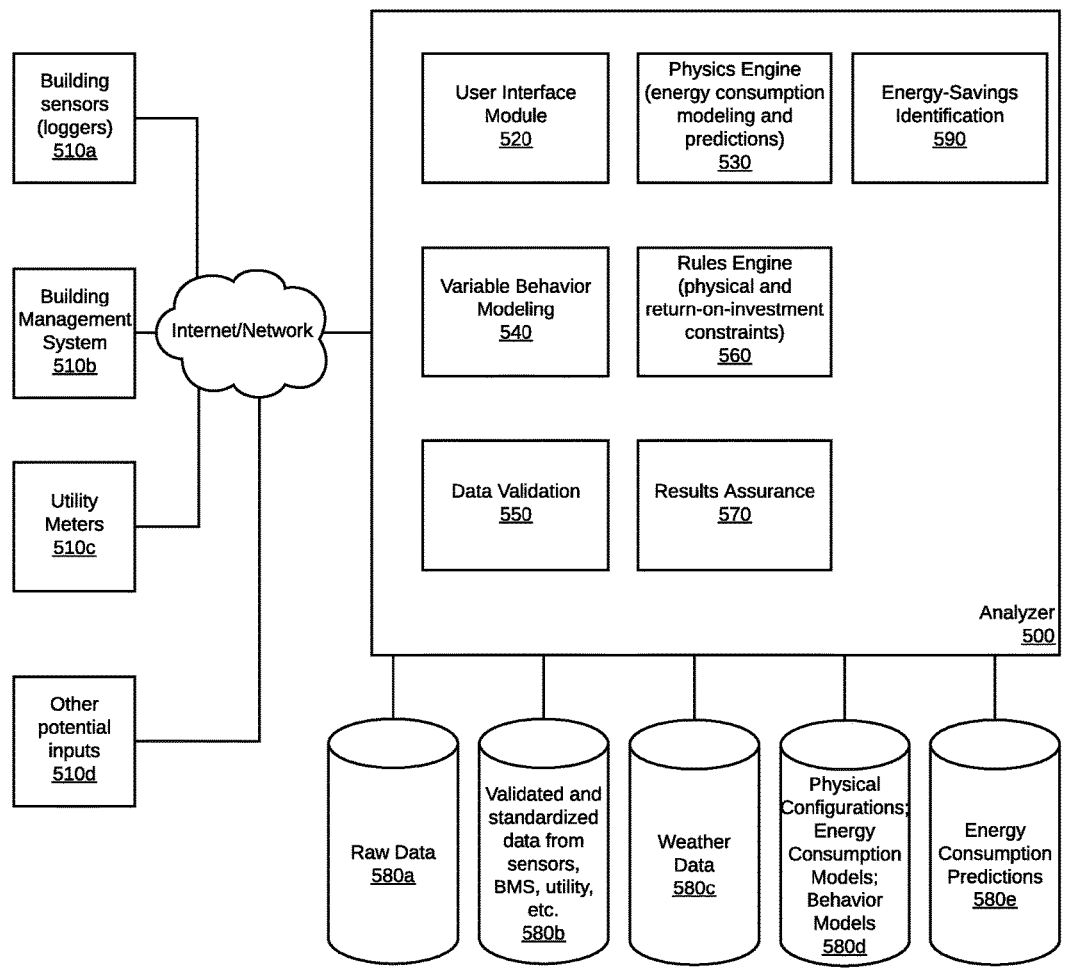
FIG. 5 is a block diagram that illustrates an example software architecture of the Analyzer according to one embodiment.

FIG. 5 illustrates an example architecture for a system that performs the methods described herein. The methods described herein may be implemented in other systems and are not limited to system 500.

System 500 receives sensor, utility and other measurement data from input data sources 510a-d. Data validation module 550 takes the heterogeneous raw input data, and validates and standardizes the data using known data validation and standardization techniques. User interface module 520 generates user interfaces for system 500, including the user interface that prompts a user for information about the physical configuration of mechanical/electrical systems in a building. The user interface may also display results of model outputs. Variable Behavior Modeling module 540 creates the behavior models based on standardized and validated input data. Physics Engine 530 generates the baseline and alternate component-, system-, and building-energy-consumption models and the corresponding baseline and alternate energy-consumption predictions. Raw data, validated/standard data, weather data, energy consumption models, behavior models, and energy consumption predictions are stored in databases 580a-580e.

Energy-Savings Identification module 590 identifies potential energy-saving measures based on the baseline and alternate energy-consumption predictions. Rules Engine 560 applies cost and return-on-investment constraints rules to potential energy-saving measures. Results assurance module 570 performs the performance verification method of FIG. 4.

6. General

The methods described with respect to FIGS. 1-8 are automated, embodied in software, and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for modeling and predicting non-plug-load energy consumption of a building, the method comprising:
    providing a user interface that enables a user to enter information about a plurality of non-plug-load mechanical/electrical systems in the building ("the mechanical/electrical systems");
    receiving information about the mechanical/electrical systems via the user interface, wherein the information includes a physical configuration for each of the mechanical/electrical systems and one or more components within each of the mechanical/electrical systems;
    creating a component energy-consumption model for one or more components in each of the mechanical/electrical systems, each component energy-consumption model comprising an applicable energy-consumption equation having one or more variables;
    for each of the mechanical/electrical systems, creating a system energy-consumption model by aggregating the component energy-consumption models of components in the mechanical/electrical system;
    creating a building-level model for the non-plug-load energy-consumption of the building by aggregating the system energy-consumption models for the mechanical/electrical systems, factoring in interactions between the mechanical/electrical systems, resulting in the building-level model having an applicable aggregate of the energy-consumption equations from the component and system energy-consumption models, each of the energy-consumption equations in the building-level model having one or more variables;
    receiving measurement data corresponding to the mechanical/electrical systems during a training period, wherein the measurement data includes data received on a continuous basis during the training period from sensors placed in the mechanical/electrical system;
    receiving weather data during the training period ("the training-period weather data");
    creating behavior models for variables in the energy-consumption equations in the building-level model from the measurement data and the training-period weather data;
    receiving weather data for a prediction period ("the prediction-period weather data");
    using the behavior models and prediction-period weather data to calculate values for variables in the energy-consumption equations in the building-level model for the prediction period;
    creating a baseline non-plug-load energy-consumption prediction for the building by applying the variable values to the building-level model, wherein applying the variables values to the building-level model comprises:
        using the variable values for the prediction period and the component energy-consumption models to calculate a predicted energy consumption of the components within the mechanical/electrical systems during the prediction period;
        using the predicted energy consumption of the components and the system energy-consumption models to calculate a predicted energy consumption of the mechanical/electrical systems during the prediction period; and
        aggregating the predicted energy consumption of the mechanical/electrical systems in the building, factoring in interactions between the mechanical/electrical systems, to obtain the baseline non-plug-load energy prediction for the building; and
    outputting the baseline non-plug-load energy-consumption prediction.

2. The method of claim 1, wherein one or more of the behavior models are created using machine learning tools.

3. The method of claim 1, wherein the prediction-period weather data is from a TMY dataset and wherein the prediction-period is a year.

4. The method of claim 1, further comprising:
    identifying a component within one of the mechanical/electrical systems having configurable settings;
    identifying a variable affected by the configurable setting;
    obtaining a setting behavior model for each of the potential settings, wherein the setting behavior models reflect the expected variable behavior for the affected variable for each of potential configuration settings; and
    comparing each of the setting behavior models to a behavior model for the variable that is based on the measurement data ("the actual behavior model") to identifying the setting behavior model that best matches the actual behavior model; and
    identifying a current configuration setting as the setting corresponding to the best-matching setting behavior model;
    using the behavior model for the variable to identify a current configuration setting for the component by modelling each of potential settings and selecting the setting that best matches the behavior model.

5. The method of claim 4, further comprising:
    retrieving physical configuration alternatives for the mechanical/electrical systems;
    for each physical configuration alternative, creating an alternate system-level energy-consumption model for the applicable mechanical/electrical system based on the physical configuration alternative;
    creating one or more alternate building energy-consumption models using one or more alternate system energy-consumption models;
    creating one or more alternate energy-consumption predictions for the building using the alternate energy-consumption models for the building, the behavior models for the variables, and the weather data, wherein:
        in response to a variable being dependent on a configurable setting of a component, multiple behavior models are created for the variable, one for each viable setting option, and an alternate energy-consumption prediction is then generated for each unique energy-consumption model/variable behavior model combination; and
    identifying the lowest energy-consumption prediction from a set of predictions comprising the one or more alternate energy-consumption predictions and the baseline non-plug load energy-consumption prediction.

6. The method of claim 5 further comprising:
    in response to one of the alternate energy-consumption predictions being the lowest energy-consumption prediction, identifying possible energy savings measures by identifying one or more differences between the physical configurations and component settings associated with the lowest energy-consumption prediction and physical configurations and component settings associated with the baseline energy-consumption prediction.

7. The method of claim 6, further comprising:
for each of the possible energy-savings measures, determining whether the measure satisfies feasibility and return-on-investment constraints; and
outputting an energy-savings proposal that lists the possible energy savings measures that satisfy feasibility and return-on-investment constraints.

8. The method of claim 1, wherein non-plug load mechanical/electrical systems include lighting systems and HVAC systems.

9. A non-transitory computer-readable medium comprising a computer program, that, when executed by a computer system, enables the computer system to perform the following method for modeling and predicting non-plug-load energy consumption of a building, the method comprising:
providing a user interface that enables a user to enter information about a plurality of non-plug-load mechanical/electrical systems in the building ("the mechanical/electrical systems");
receiving information about the mechanical/electrical systems via the user interface, wherein the information includes a physical configuration for each of the mechanical/electrical systems and one or more components within each of the mechanical/electrical systems;
creating a component energy-consumption model for one or more components in each of the mechanical/electrical systems, each component energy-consumption model comprising an applicable energy-consumption equation having one or more variables;
for each of the mechanical/electrical systems, creating a system energy-consumption model by aggregating the component energy-consumption models of components in the mechanical/electrical system;
creating a building-level model for the non-plug-load energy-consumption of the building by aggregating the system energy-consumption models for the mechanical/electrical systems, factoring in interactions between the mechanical/electrical systems, resulting in the building-level model having an applicable aggregate of the energy-consumption equations from the component and system energy-consumption models, each of the energy-consumption equations in the building-level model having one or more variables;
receiving measurement data corresponding to the mechanical/electrical systems during a training period, wherein the measurement data includes data received on a continuous basis during the training period from sensors placed in the mechanical/electrical system;
receiving weather data during the training period ("the training-period weather data");
creating behavior models for variables in the energy-consumption equations in the building-level model from the measurement data and the training-period weather data;
receiving weather data for a prediction period ("the prediction-period weather data");
using the behavior models and prediction-period weather data to calculate values for variables in the energy-consumption equations in the building-level model for the prediction period;
creating a baseline non-plug-load energy-consumption prediction for the building by applying the variable values to the building-level model, wherein applying the variables values to the building-level model comprises:
using the variable values for the prediction period and the component energy-consumption models to calculate a predicted energy consumption of the components within the mechanical/electrical systems during the prediction period;
using the predicted energy consumption of the components and the system energy-consumption models to calculate a predicted energy consumption of the mechanical/electrical systems during the prediction period; and
aggregating the predicted energy consumption of the mechanical/electrical systems in the building, factoring in interactions between the mechanical/electrical systems, to obtain the baseline non-plug-load energy prediction for the building; and
outputting the baseline non-plug-load energy-consumption prediction.

10. The non-transitory computer-readable medium of claim 9, wherein one or more of the behavior models are created using machine learning tools.

11. The non-transitory computer-readable medium of claim 9, wherein the prediction-period weather data is from a TMY dataset and wherein the prediction period is a year.

12. The non-transitory computer-readable medium of claim 9, further comprising:
identifying a component within one of the mechanical/electrical systems having configurable settings;
identifying a variable affected by the configurable setting; and
using the behavior model for the variable to identify a current configuration setting for the component.

13. The non-transitory computer-readable medium of claim 12, further comprising:
retrieving physical configuration alternatives for the mechanical/electrical systems;
for each physical configuration alternative, creating an alternate system-level energy-consumption model for the applicable mechanical/electrical system based on the physical configuration alternative;
creating one or more alternate building energy-consumption models using one or more alternate system energy-consumption models;
creating one or more alternate energy-consumption predictions for the building using the alternate energy-consumption models for the building, the behavior models for the variables, and the weather data, wherein:
in response to a variable being dependent on a configurable setting of a component, multiple behavior models are created for the variable, one for each viable setting option, and an alternate energy-consumption prediction is then generated for each unique energy-consumption model/variable behavior model combination; and
identifying the lowest energy-consumption prediction from a set of predictions comprising the one or more alternate energy-consumption predictions and the baseline energy-consumption prediction.

14. The non-transitory computer-readable medium of claim 13 further comprising:
in response to one of the alternate energy-consumption predictions being the lowest energy-consumption prediction, identifying possible energy savings measures by identifying one or more differences between the physical configurations and component settings associated with the lowest energy-consumption prediction and the current configurations and component settings of the mechanical/electrical system(s).

15. The non-transitory computer-readable medium of claim 14, further comprising:
for each of the possible energy-savings measures, determining whether the measure satisfies feasibility and return-on-investment constraints; and
outputting an energy-savings proposal that lists the possible energy savings measures that satisfy feasibility and return-on-investment constraints.

16. The non-transitory computer-readable medium of claim 9, wherein non-plug load mechanical/electrical systems include lighting systems and HVAC systems.

17. A computer system for modeling and predicting non-plug-load energy consumption, the system comprising:
one or more processors;
one or more memory units coupled to the one or more processors, wherein the one or more memory units store instructions that, when executed by the one or more processors, cause the system to perform the operations of:
providing a user interface that enables a user to enter information about a plurality of non-plug-load mechanical/electrical systems in the building ("the mechanical/electrical systems");
receiving information about the mechanical/electrical systems via the user interface, wherein the information includes a physical configuration for each of the mechanical/electrical systems and one or more components within each of the mechanical/electrical systems;
creating a component energy-consumption model for one or more components in each of the mechanical/electrical systems, each component energy-consumption model comprising an applicable energy-consumption equation having one or more variables;
for each of the mechanical/electrical systems, creating a system energy-consumption model by aggregating the component energy-consumption models of components in the mechanical/electrical system;
creating a building-level model for the non-plug-load energy-consumption of the building by aggregating the system energy-consumption models for the mechanical/electrical systems, factoring in any interactions between the mechanical/electrical systems, resulting in the building-level model having an applicable aggregate of the energy-consumption equations from the component and system energy-consumption models, each of the energy-consumption equations in the building-level model having one or more variables;
receiving measurement data corresponding to the mechanical/electrical systems during a training period, wherein the measurement data includes data received on a continuous basis during the training period from sensors placed in the mechanical/electrical system;
receiving weather data during the training period ("the training-period weather data");
creating behavior models for variables in the energy-consumption equations in the building-level model from the measurement data and the training-period weather data;
receiving weather data for a prediction period ("the prediction-period weather data");
using the behavior models and prediction-period weather data to calculate values for variables in the energy-consumption equations in the building-level model for the prediction period;
creating a baseline non-plug-load energy-consumption prediction for the building by applying the variable values to the building-level model, wherein applying the variables values to the building-level model comprises:
using the variable values for the prediction period and the component energy-consumption models to calculate a predicted energy consumption of the components within the mechanical/electrical systems during the prediction period;
using the predicted energy consumption of the components and the system energy-consumption models to calculate a predicted energy consumption of the mechanical/electrical systems during the prediction period; and
aggregating the predicted energy consumption of the mechanical/electrical systems in the building, factoring in interactions between the mechanical/electrical systems, to obtain the baseline non-plug-load energy prediction for the building; and
outputting the baseline non-plug-load energy-consumption prediction.

18. The system of claim 17, wherein one or more of the behavior models are created using machine learning tools.

19. The system of claim 17, wherein the prediction-period weather data is from a TMY dataset and wherein the prediction period is a year.

20. The system of claim 17, further comprising:
identifying a component within one of the mechanical/electrical systems having configurable settings;
identifying a variable affected by the configurable setting; and
using the behavior model for the variable to identify a current configuration setting for the component.

21. The system of claim 20, further comprising:
retrieving physical configuration alternatives for the mechanical/electrical systems;
for each physical configuration alternative, creating an alternate system-level energy-consumption model for the applicable mechanical/electrical system based on the physical configuration alternative;
creating one or more alternate building energy-consumption models using one or more alternate system energy-consumption models;
creating one or more alternate energy-consumption predictions for the building using the alternate energy-consumption models for the building, the behavior models for the variables, and the weather data, wherein:
in response to a variable being dependent on a configurable setting of a component, multiple behavior models are created for the variable, one for each viable setting option, and an alternate energy-consumption prediction is then generated for each unique energy-consumption model/variable behavior model combination; and
identifying the lowest energy-consumption prediction from a set of predictions comprising the one or more alternate energy-consumption predictions and the baseline energy-consumption prediction.

22. The system of claim 21 further comprising:
in response to one of the alternate energy-consumption predictions being the lowest energy-consumption prediction, identifying possible energy savings measures by identifying one or more differences between the physical configurations and component settings associated with the lowest energy-consumption prediction and the current configurations and component settings of the mechanical/electrical system(s).

23. The system of claim 22, further comprising:

for each of the possible energy-savings measures, determining whether the measure satisfies feasibility and return-on-investment constraints; and outputting an energy-savings proposal that lists the possible energy savings measures that satisfy feasibility and return-on-investment constraints.

24. The system of claim 17, wherein non-plug load mechanical/electrical systems include lighting systems and HVAC systems.

25. The method of claim 1, wherein the measurement data also includes building management system data, data from utility systems, and static input data.

26. The non-transitory computer-readable medium of claim 9, wherein the measurement data also includes building management system data, data from utility systems, and static input data.

27. The system of claim 17, wherein the measurement data also includes building management system data, data from utility systems, and static input data.

\* \* \* \* \*